US012792829B2

(12) United States Patent
Levenson et al.

(10) Patent No.: US 12,792,829 B2
(45) Date of Patent: Nov. 10, 2026

(54) CONTENT SAFETY PLATFORM

(71) Applicant: Moonbounce, Inc., Oakland, CA (US)

(72) Inventors: Brett Levenson, Oakland, CA (US); Ashwini Bhardwaj, Fremont, CA (US)

(73) Assignee: Moonbounce, Inc., Oakland, CA (US)

( * ) Notice: Subject to any disclaimer, the term of this patent is extended or adjusted under 35 U.S.C. 154(b) by 0 days.

(21) Appl. No.: 18/917,583

(22) Filed: Oct. 16, 2024

(65) Prior Publication Data

US 2026/0050736 A1 Feb. 19, 2026

Related U.S. Application Data

(60) Provisional application No. 63/683,481, filed on Aug. 15, 2024.

(51) Int. Cl.

*G06F 40/211* (2020.01)
*G06N 20/20* (2019.01)
*G06Q 10/40* (2026.01)

(52) U.S. Cl.

CPC .......... *G06F 40/211* (2020.01); *G06N 20/20* (2019.01); *G06Q 10/40* (2026.01)

(58) Field of Classification Search

None

See application file for complete search history.

(56) References Cited

U.S. PATENT DOCUMENTS

| | | | | |
|---|---|---|---|---|
| 8,826,443 | B1 * | 9/2014 | Raman | G06F 21/6245 726/26 |
| 12,111,754 | B1 * | 10/2024 | Mysore | G06N 20/00 |
| 2014/0047413 | A1 * | 2/2014 | Sheive | G06F 8/33 717/110 |
| 2015/0058672 | A1 * | 2/2015 | Kube | G06F 11/263 714/33 |
| 2019/0235848 | A1 * | 8/2019 | Swiecki | G06F 8/76 |
| 2020/0267165 | A1 * | 8/2020 | Leliwa | H04L 51/02 |
| 2021/0089778 | A1 * | 3/2021 | Laverty | G06V 10/82 |
| 2021/0357843 | A1 * | 11/2021 | Yarlagadda | G06Q 40/02 |
| 2023/0396457 | A1 * | 12/2023 | Huffman | H04L 12/1822 |

* cited by examiner

*Primary Examiner* — Pierre Louis Desir
*Assistant Examiner* — Kristen Michelle Masters
(74) *Attorney, Agent, or Firm* — Van Pelt, Yi & James LLP

(57) ABSTRACT

A structured specification of a content safety policy is received. The structured specification of the content safety policy conforms to a syntax. Content to be evaluated is received. The received content is evaluated using the structured specification of the content safety policy to determine whether the received content violates the content safety policy.

20 Claims, 9 Drawing Sheets

CONTENT SAFETY PLATFORM

CROSS REFERENCE TO OTHER APPLICATIONS

This application claims priority to U.S. Provisional Patent Application No. 63/683,481 entitled ADAPTABLE AUTOMATIC CONTENT MODERATION filed Aug. 15, 2024 which is incorporated herein by reference for all purposes.

BACKGROUND OF THE INVENTION

The rapid growth of online platforms has led to an unprecedented increase in user-generated content. Social media networks, forums, and other online communities have become central to modern communication, enabling users to share information, opinions, and media instantly. However, this surge in content has also brought challenges, particularly in maintaining a safe and respectful environment. Each year, it gets harder for platforms to enforce their policies and create a safe online environment, as they come under attack from bad actors generating objectionable, explicit, or outright illegal content. Online platforms are under immense pressure to keep their online communities safe, and the consequences of failure extend beyond legal or reputational risks. Traditional content moderation methods often rely on human moderators to review and manage content. This approach is labor-intensive, time-consuming, and prone to inconsistencies. Additionally, the sheer volume of content generated daily makes it impractical to rely solely on human moderation. Even when automated moderation is utilized, existing systems are difficult to deploy and maintain, slow to adapt to fast changing threats, and inflexible for many desired use cases. Therefore, there exists a need for more efficient and agile content moderation.

BRIEF DESCRIPTION OF THE DRA WINGS

Various embodiments of the invention are disclosed in the following detailed description and the accompanying drawings.

DETAILED DESCRIPTION

Figure 1:
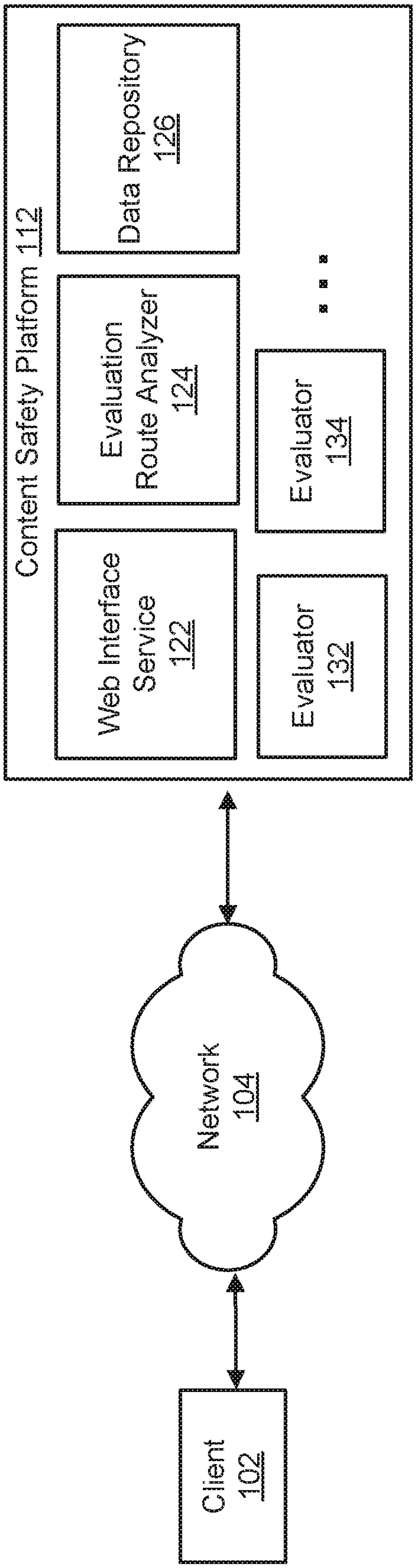
FIG. 1 is a block diagram illustrating an example of a network environment for using a content safety platform.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A content safety platform is disclosed. In various embodiments, the content safety is fast, customizable, testable, agile, explainable, consistent, proactive, and scalable. Fast: Various embodiments operate in real or near-real time, crucial for scenarios like online gaming and dating to prevent bullying and harassment immediately. Customizable: Recognizing the unique challenges of different platforms, various embodiments allow for tailored rules and user-specific controls, ensuring flexibility and adaptability. Testable: Even with AI components, various embodiments are designed to be testable, providing predictable and reliable behavior, which builds trust among users and operators. Agile: Various embodiments are capable of quickly adapting to new threats and tactics, particularly important in the dynamic landscape of online safety and AI security. Explainable: Transparency is key, with various embodiments offering clear explanations for actions taken, fostering user trust and understanding of moderation decisions. Consistent and Accurate: Various embodiments provide the consistent application of rules, measuring accuracy by adherence to defined guidelines. Proactive: Moving beyond reactive measures, various embodiments aim for proactive content review, striving for comprehensive coverage to prevent issues before they escalate. Scalable: Designed to handle the increasing volume of content generated by AI, various embodiments ensure scalability to manage associated risks effectively. In various embodiments, a structured AI policy engine is utilized to streamline the development and enforcement of content safety policies. Using a structured language, users can quickly write and implement detailed policies, ensuring consistent and scalable rule application. Policies can be quickly updated and redeployed to counter evolving tactics of bad actors. The AI policy engine provides specific feedback on policy violations, enhancing transparency and understanding of harmful activities.

In some embodiments, a structured specification of a content safety policy conforming to a syntax is received. For example, a client's content safety policy including content moderation policy and/or certain rules/standards/guidelines that prohibit content that is harmful, sensitive, inappropriate, violent, hateful, and/or misinformation is specified in a structured syntax format for evaluation or implementation. The content to be evaluated is received. For example, a content safety platform receives content to be processed to determine if it violates the content safety policy. The content is evaluated using the structured specification to determine whether the content violates the content safety policy. This is accomplished using a structured specification conforming to the structured syntax that can be easily parsed into a series of component evaluations that are transparent, understandable, and flexible. Outcomes of the component evaluations are used to determine whether the content violates the content safety policy. Artificial intelligence and machine learning models are often great at identifying objects, concepts, and contexts in isolation, but not great at judgment, reasoning, and problem solving. The structured specification allows a user to employ the judgment, reasoning, and problem-solving abilities of the user to specify the policy in a deterministic and repeatable way. The platform is able to then leverage evaluators that utilize artificial intelligence and machine learning models to handle discrete component evaluation tasks of the structured specification to improve content evaluation performance.

FIG. 1 is a block diagram illustrating an example of a network environment for using a content safety platform. In the example shown, client 102, and content safety platform 112 are connected via network 104. Network 104 can be a public or private network. In some embodiments, network 104 is a public network such as the internet. Examples of network 104 include one or more of the following: a direct or indirect physical communication connection, internet, intranet, Local Area Network, Wide Area Network, Storage Area Network, and any other form of connecting two or more systems, components, or storage devices together. In various embodiments, content safety platform 112 includes web interface service 122, evaluation route analyzer 124, data repository 126, evaluator 132, and evaluator 134. In some embodiments, evaluation route analyzer 124, evaluator 132, and evaluator 134 are used to implement content safety evaluation.

Content safety platform 112 is communicatively connected to client 102 and offers its content safety evaluation/moderation service to clients that utilize a device such as client 102 to configure/utilize content safety platform 112. In some embodiments, client 102 uses web interface service 122 to develop and test a content safety policy, and content safety platform 112 implements the specified content safety policy. For example, client 102 can edit and submit a policy as well as test and visualize the policy's performance on a sample dataset using web interface service 122. In various embodiments, client 102 can be a network device such as a desktop computer, a laptop, a tablet, or another network computing device. In some embodiments, client 102 uploads data to data repository 126 to be processed by the content safety evaluation service of content safety platform 112 and access content safety evaluation services offered by content safety platform 112 through web interface service 122.

In some embodiments, data repository 126 provides content data, such as user generated content to be analyzed by content safety platform 112. For example, content safety platform 112 executes its automated content safety evaluation/moderation service on the data in data repository 126. In some embodiments, users upload data to data repository 126 periodically or continuously for evaluation. Uploaded data can be in the form of text, image, audio, or video. In various embodiments, data repository 126 is a storage system (e.g., a database, file system, or cloud-based storage system).

In some embodiments, content safety platform 112 is a platform that offers content safety services configurable through web interface service 122. In the example shown, content safety platform 112 includes web interface service 122, evaluation route analyzer 124, data repository 126, evaluator 132, and evaluator 134. In some embodiments, a content safety policy specified using web interface service 122 is implemented using evaluation route analyzer 124. The policy can be decomposed into a set of query evaluations to perform, and evaluation route analyzer 124 determines the most effective and efficient evaluator for each query evaluation. In some embodiments, results of each evaluator are stored in data repository 126. In some embodiments, the results of the evaluations are provided via web interface service 122 and made visible to client 102. Although two evaluators are shown in the example of FIG. 1, any number of evaluators may be utilized in various embodiments.

In some embodiments, the components shown in FIG. 1 may exist in various combinations of hardware machines. Although single instances of some components have been shown to simplify the diagram, additional instances of the components shown in FIG. 1 may exist. For example, content safety platform 112 can include one or more servers for web interface service 122, evaluation route analyzer 124, data repository 126, evaluator 132, and evaluator 134. The included servers can include distributed servers, application servers, and database servers, among others. As shown in FIG. 1, client 102 is just one example of a potential client to content safety platform 112. In some embodiments, components not shown in FIG. 1 may also exist.

Figure 2:
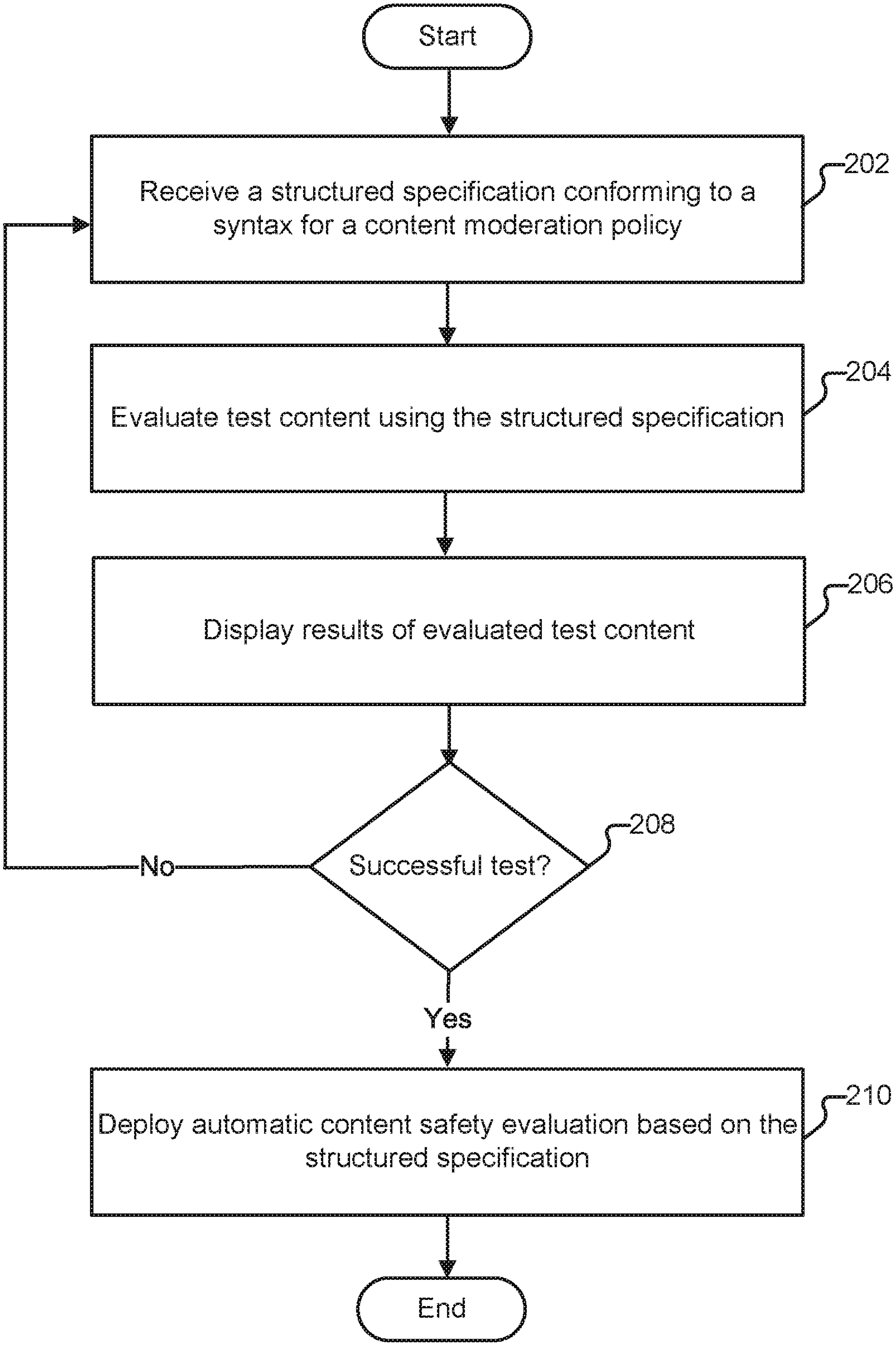
FIG. 2 is a flow chart illustrating an embodiment of a process for developing and deploying an effective content safety policy.

FIG. 2 is a flow chart illustrating an embodiment of a process for developing and deploying an effective content safety policy. For example, using the process of FIG. 2, automatic content safety evaluation is customized by a client and tested and deployed using a content safety platform. In some embodiments, the process of FIG. 2 is at least in part executed by content safety platform 112 of FIG. 1. In some embodiments, the process of FIG. 2 is provided to client 102 through web interface service 122 of FIG. 1.

At 202, a structured specification for a content safety policy conforming to a syntax is received. For example, the structured specification is received by content safety platform 112 of FIG. 1 using web interface service 122 of FIG. 1.

In order to automate content safety evaluation, an existing description of a content safety policy is often manually coded by a developer into complex program code for program execution. This is often time-consuming to develop and test, and prone to errors. Rather than requiring complex implementation program code, the content safety policy is able to be specified in a syntax that is structured and unambiguous yet easy to specify and understand. This allows even a non-technical user to develop, test, and iterate an unambiguous version of the content safety policy by following simple syntax rules for the structured specification for a content safety policy. The content safety platform is able to convert and implement the content safety policy in the syntax into an executable version that can be applied to content to be moderated.

In some embodiments, the structured specification is provided via a web interface service, such as web interface service 122 of FIG. 1 using a user interface such as but not limited to a code editor, text editor, block editor, drag-and-drop editor, template-based editor, and form editor. In some embodiments, the user interface for creating and editing the structured specification provides development support such as error checking, autofill, and suggestions. For example, the user interface can highlight a section of the structured specification and suggest an edited version of the section that will be more compatible downstream in the content safety policy. In various embodiments, the syntax of the structured specification for a content safety policy is in a domain-specific language. In some embodiments, the syntax conforms to a hierarchical order of operations. In some embodiments, the syntax is comprehensible by a client and formatted for machine parsing. In some embodiments, the structured specification contains predetermined components, including but not limited to section descriptors, Boolean logic, context operators, matching operators, and questions.

In some embodiments, the structured specification is hierarchically organized. For example, the structured specification specifies one or more policies and each policy contains one or more sections. The policies are the top-level objects in the hierarchy. They have a name, which can be one or more words. The following is an example of the basic structure of a policy:

```
POLICY "Foo" {
  [Sections go here]
}
```

The name of this policy, in the example above, is "Foo." A policy can, optionally, have an EXCEPT WHEN block that will invalidate all the sections and assertions in the policy if it is matched. This block is used when there are policy exceptions that apply to every rule in the policy. An example is below:

```
POLICY "Foo" {
  [Sections go here]
} EXCEPT WHEN {
  [Exception rules go here]
}
```

A section can have a name if desired. If a section does not have a name, it can still be referred to by its "section number." A section may have a "risk level" or "recommended action." The "actions"/"risk levels" will be returned in the response payload after content has been analyzed and matched. The section body begins with a {and ends with a} character. Much like policies, sections can also have an EXCEPT WHEN block. The rules in this block will apply only to the section to which they are attached. A rule or assertion is the meat of the policy in the structured specification. They explain, logically, how to decide whether the content violates, or does not violate, one of the policies. A section can contain many rules. If any one of those rules match, the entire section will match.

Result of the outcome of each rule evaluation may be provided so as to get more detail on a particular section's evaluation. Assertions use logical statements, and certain keywords are logical in nature. The following are example logical operators: NOT, AND, OR, NONE, ALL, and ANY. Each of these operators will accept individual signal names, or other logical statements as their parameters. For example, one can use AND to evaluate whether there's a monkey and a bicycle: "monkey" AND "bicycle." But one can also use it to see if there's a monkey, and a bicycle or tricycle: "monkey" AND ("bicycle" OR "tricycle"). NONE, ALL, and ANY logical operators are called the "none," "universal" and "existential" operators. NONE is similar to "NOT" but operates on a list of values. Likewise, ALL is similar to "AND" and ANY is similar to "OR" but both of these operate on lists of values. For ALL to evaluate to True, all of the statements inside ALL's brackets must evaluate to True. For ANY to evaluate to True, at least one of the statements inside ANY's brackets must evaluate to True. For NONE to evaluate to True, all of the statements inside NONE's brackets must evaluate to False.

It's often not enough to know whether a set of objects/concepts are present in content. Sometimes it is desirable to know more about the "context" in which those objects/concepts appear. Context operators are used to specify that certain objects or concepts must appear or be present in a specific context. To indicate that an operator is intended to describe the "context relationship" between two signals, the keywords are enclosed in brackets ([OPERATOR]). For example: "person" [WITH] "weapon," or "weapon" [IN CONTEXT] "threatening," or even "weapon" [IN CONTEXT] "holding," or "threatening" [BY] "person." Each of these statements places a person or weapon in a more specific context. With respect to context operators, IN CONTEXT is used to connect an object to a specific context. The object should be on the left and the context on the right. The general syntax for context operators is: "subject" [CONTEXT OP] "target." Each context statement connects a signal with another signal. An example of a context statement is "weapon" [IN CONTEXT] "threatening."

Matching operators can be used to determine if a specific word or phrase is present in the content, or if the content contains a general kind of sentiment. Sentiment operators can apply to text and images. These operators have a signal list inside their parentheses. A signal list is a list of words/phrases/sentiments to look for. The exact match operator is in the form: =( . . . ). If there exists more than one signal in the list, OR logic will be applied. Thus, =("dog," "cat," "pony") is equivalent to: =("dog") OR =("cat") OR =("pony").

The fuzzy match operator, which is in the form: ~( . . . ) will match the words or phrases inside the parentheses according to their meaning or their similarity to the words or phrases included. These operators can be used to pick up things like "leetspeak," where a user attempts to obscure a word by replacing one or more letters with an asterisk. The sentiment match operator, which is in the form: Sentiment ( . . . ) can be used to perform a sentiment analysis on the entire piece of content. For example, to check for a "threatening" sentiment on a piece of content one can utilize: Sentiment ("threatening").

An example of a structured specification confirming to a syntax for content safety policy is the following:

```
POLICY "Violence - Assertions"{
    Section "Fighting": "MEDIUM" {
      "person" AND "fighting"
    } EXCEPT WHEN {
      "art"
    }
    Section "Weapon Violence": "HIGH" {
```

-continued

```
        "person" [WITH] "weapon" AND ("weapon"
          [IN CONTEXT] "threatening" OR "weapon"
          [IN CONTEXT] "aggressive")
      }
      Section "Weapon Sales": "ENQUEUE"
        All (
          "person" [WITH] "weapon",
          "weapon" [IN CONTEXT] "sale"
        )
      }
    }
```

In some embodiments, questions are able to be included in the structured specification. Questions can be a free-form phrase that is to be answered with "yes" or "no." A question in the syntax is any statement, enclosed in quotation marks, that ends in a question mark (e.g., "Is this hate speech?"). An example of a structured specification utilizing questions is the following:

```
Policy "Violence - Questions" {
  Section "Sale Questions" {
    All (
      "Is there a weapon present in the content?",
      "Does the content attempt to sell goods or
      services?",
      "Does the content attempt to sell a weapon?"
    )
  },
  Section "Weapon Violence" {
    All (
      "Is there more than one person present?",
      "Is one person acting aggressively towards the
      other?",
      "Is a weapon being used?",
      "Is the weapon being used to injure, threaten, or
      harm a person or animal?"
    )
  }
}
```

In some embodiments, the structured specification is automatically generated based on a prose text description of a content safety policy. For example, an existing prose text description of a content safety policy is automatically translated into the structured specification that follows the specific syntax. This may be performed using a machine learning model (e.g., a large language model, a transformer model, or any other machine learning model).

At 204, test content is evaluated using the structured specification. In some embodiments, the received structured specification is converted into a format that can be used to evaluate the test content. For example, the structured specification is compiled and/or interpreted into an execution version. In some embodiments, the structured specification is decomposed into a series of queries that are organized into a decision tree. When the content is evaluated, each of one or more of the queries are answered using a dynamically selected evaluator. Examples of the evaluation include one or more of the following: machine learning models, large language models, embedding models, object detection models, heuristics, algorithms, content filtering engines, anomaly detection software, dynamic risk assessment engines, and any other tool or software that can be used to evaluate content. In some embodiments, test content is evaluated separately by each component of the parsed structured specification by the evaluation tool best suited for integrating the corresponding component of the structured specification into the evaluation. In some embodiments, when sufficient queries have been answered in the decision tree to determine a result, the evaluation can be concluded. For example, queries that are evaluated in the decision tree have been selected by following decision branches of the decision tree based on corresponding results of the queries until the decision tree terminates in a result. In some embodiments, evaluating the test content using the structured specification includes assigning a value, score, or label based on whether the test content violates the structured specification and which components of the structured specification were violated. In some embodiments, a violation type or category is identified in response to a determination that the content violates the content safety policy. In some embodiments, test content includes benign examples and examples that violate the structured specification. In some embodiments, the test content is paired with ground truth labels. In some embodiments, the test content is provided by a content safety platform, such as content safety platform 112 of FIG. 1, or uploaded by a client, such as client 102 of FIG. 1.

At 206, results of the evaluated test content are displayed. In some embodiments, results of the evaluated test content are displayed on a user interface, such as web interface service 122 of FIG. 1. In some embodiments, the text of the structured specification and the result of the evaluation are displayed on the same screen of a content safety policy user interface. In some embodiments, the result of the evaluation includes a list of content elements and corresponding element evaluation results. In some embodiments, displaying the evaluated test content results includes displaying the result determined at 204 and the annotated ground truth label(s). In some embodiments, displaying the evaluated test content result includes labelling mismatched examples with a special label, providing performance statistics, and/or notifying the client with suggestions for improvement to the structured specification. In some embodiments, for each example in the test content identified as a violation of the structured specification during step 204, a client is provided a visual identification of a specific section of the structured policy that was violated. For example, a portion of the structured specification is visually highlighted to indicate the policy section of the structured specification that the test content violated. In some embodiments, the client can request to view the result of the individual rules/assertions in the structured specification used to evaluate the test content at 204, and the result of each individual rule/assertion will be provided.

At 208, it is determined whether the test was successful. In some embodiments, a successful test is when the content safety platform achieves a threshold performance measurement. For example, the performance measurement can be an accuracy rate or series of metrics such as true positive rate, false positive rate, and false negative rate. In some embodiments, the threshold value for the performance measurement is set by the client or the content safety platform or is set at the default/industry standard. In some embodiments, a successful test is measured by the efficiency of the content safety service. For example, a successful test minimizes the resources used and computations. In some embodiments, whether the test was successful is determined automatically by the content safety platform. In some embodiments, the success of a test can be manually determined by the user. If at 208 it is determined that the test was successful, the process proceeds to 210. If at 208 it is determined that the test was unsuccessful, the user is provided an opportunity to modify/improve the structured specification of the content safety policy. Then the process can return to 202 with the modified structured specification. For example, a modification to the structured specification is received via a provided user interface, and an indication to evaluate a portion of the content using the modified structured specification is received. In some embodiments, in determining that a test was unsuccessful, the content safety platform may provide suggestions to the client on how to modify/improve the structured specification.

At 210, automatic content safety evaluation based on the structured specification is deployed. For example, the validated structured specification is saved and used for evaluating content as part of an automatic content safety service provided by the content safety platform. In some embodiments, a machine learning language model is used to generate a prose text description version of the content safety policy specified by the structured specification. For example, the structured specification version of the content policy is automatically translated using a machine learning model (e.g., a large language model, a transformer model, or any other machine learning model) to the prose text description version for consumption by humans outside the platform. In some embodiments, a platform, such as content safety platform 112 of FIG. 1, performs the automatic content safety evaluation as a service by evaluating content that the platform is provided access to. In some embodiments, a deployment version of the structured specification is generated and provided to a client that executes the deployment version in a computing environment of the client to analyze/moderate content.

Figure 3:
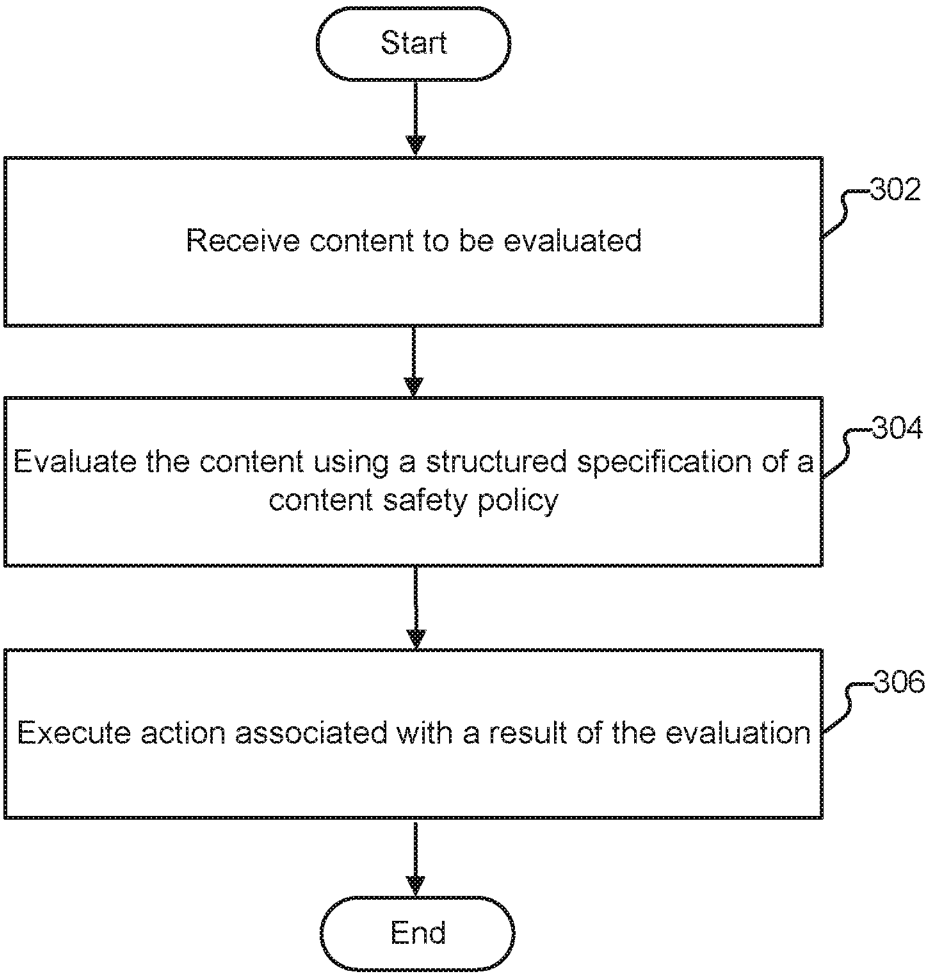
FIG. 3 is a flow chart illustrating an embodiment of a process for automatic content safety evaluation.

FIG. 3 is a flow chart illustrating an embodiment of a process for automatic content safety evaluation. For example, using the process of FIG. 3, content is evaluated to determine whether it complies with or violates a content safety policy. In some embodiments, at least a portion of the process of FIG. 3 is performed during 210 of FIG. 2. In some embodiments, the process of FIG. 3 is executed by content safety platform 112 of FIG. 1 as part of an automatic content safety service for a client such as client 102 of FIG. 1. In some embodiments, the process of FIG. 2 is performed before the process of FIG. 3.

At 302, content to be evaluated is received. In some embodiments, the content is provided to the content safety platform being protected by the content safety policy. For example, client 102 of FIG. 1 has access to an automatic content safety service and indicates content from their online platform. In some embodiments, the content is received at data repository 126 of FIG. 1 via network 104 of FIG. 1. Examples of the content to be evaluated in various embodiments include textual content, image content, video content, audio content, user-generated comments, links and embedded content, profile information, advertising and sponsored content, and any other user provided content. In some embodiments, content evaluation is invoked via an Application Programming Interface (API) with an indicated content safety policy to be applied.

At 304, the content is evaluated using a structured specification of a content safety policy. For example, any prohibited content associated with harassment, hate speech, sexual content, vulgarity, violence, player experience, or any other online safety issue is to be identified in the content as per the structured specification of the content safety policy. In some embodiments, an execution version of the structured specification of a content safety policy is identified and retrieved from a data repository, such as data repository 126 of FIG. 1. For example, a particular content safety policy to be applied has been specified, and the corresponding structured specification is identified and retrieved.

In some embodiments, the structured specification of the content safety policy is generated using the process of FIG. 2. In some embodiments, evaluating the content includes compiling the structured specification into a set of queries and selecting for each of at least a portion of the set of queries, which type of evaluation among a plurality of types of evaluations to perform. In some embodiments, evaluating the content includes using a decision tree to determine when a sufficient portion of the structured specification has been evaluated to reach a result. In some embodiments, the set of queries, types of evaluation for the set of queries, and decision tree are determined using at least the process of FIG. 4. In some embodiments, evaluating the content includes classifying the content as violating the content safety policy, as benign, or requiring additional or human evaluation. In some embodiments, determining that the content violates the content safety policy includes identifying a violation type or category. In some embodiments, a confidence score for the determined classification is also determined.

At 306, an action associated with a result of the evaluation is executed. In some embodiments, the result of the evaluation is a classification of the content. Examples of the action to a determination that the content violates the content safety policy include blocking the content from being accessed or displayed, indicating the content for additional or human evaluation, reporting any user tags associated with the content, or informing a user associated with the content violation. In some embodiments, the result of the evaluation includes a severity indication (e.g., specified in the structured specification for the matched policy section) and/or a confidence score and the action to be performed is selected based on the severity indication and/or the confidence score. For example, if the result of the evaluation contains a low severity and/or low confidence score, the responsive action includes indicating the content for additional or human evaluation, while if the result of the evaluation contains a high severity and/or high confidence score, the responsive action includes indicating the blocking the content from being accessible. In some embodiments, the responsive action to a determination that the content is benign includes allowing the content to be posted, accessible, and or viewed by others.

Figure 4:
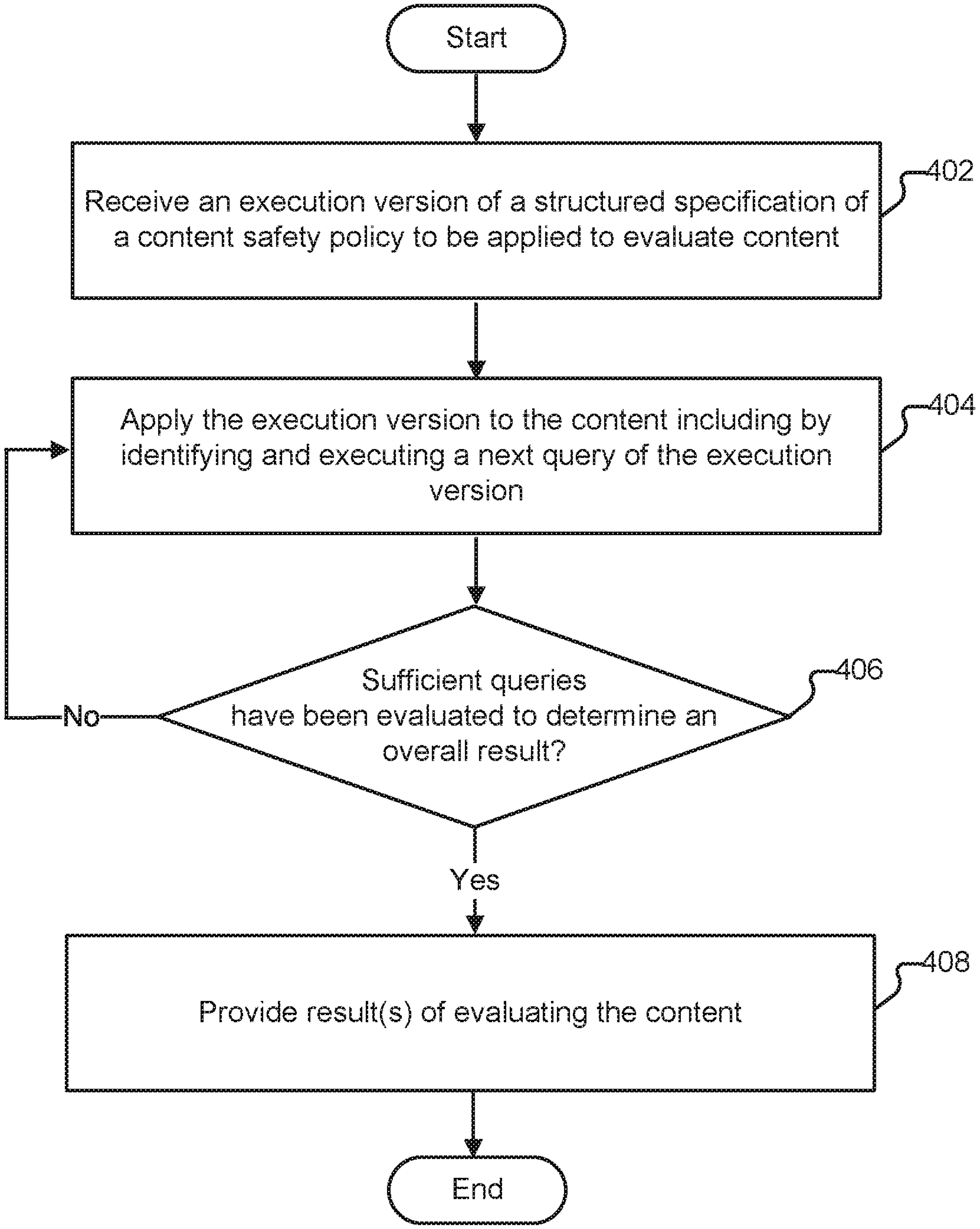
FIG. 4 is a flow chart illustrating an embodiment of a process for evaluating content using a structured specification of a content safety policy.

FIG. 4 is a flow chart illustrating an embodiment of a process for evaluating content using a structured specification of a content safety policy. For example, the process of FIG. 4 is performed as a part of an automatic content safety service provided by a content safety platform. In some embodiments, the process of FIG. 3 is executed by content safety platform 112 of FIG. 1. In some embodiments, at least a portion of the process of FIG. 3 is performed in 204 of FIG. 2. In some embodiments, at least a portion of the process of FIG. 4 is performed in 304 of FIG. 3.

At 402, an execution version of a structured specification of a content safety policy to be applied to evaluate content is received. For example, from a repository of execution versions of structured specifications of different content safety policies, the specific execution version corresponding to the specific content safety policy to be applied to evaluate the specific content is received in response to a request. The request may include an identifier of the execution version, the structured specification, and/or the content safety policy that has been specified or determined automatically based on the content to be evaluated and/or an associated user. In some embodiments, the structured specification of the content safety policy was converted into the execution version. For example, the structured specification received in 202 of FIG. 2 is compiled into the execution version that can be executed to evaluate content. The execution version may organize the structured specification into a decision tree. For example, when executed, the execution version generates a set of queries that are individually evaluated in a context of the decision tree to get to an overall match result for the structured specification of the content safety policy.

At 404, the execution version is applied to the content including by identifying and executing a next query of the execution version. In some embodiments, the execution version generates a set of queries that need to be answered to determine a match result for the content safety policy being evaluated against content. For example, the queries may be not human-readable, but in effect, they specify a question to be answered. When a query is evaluated, it is provided to a dynamic router (e.g., router analyzer 124 of FIG. 1) that analyzes the query to select the best evaluator among a plurality of evaluator options (e.g., evaluator 132, 134, etc. of FIG. 1) to answer the query. Examples of the evaluator include one or more of the following: a machine learning model, a large language model, an embedding model, an object detection model, a keyword matcher, an image classifier, a video classifier, a named entity recognition, a heuristic, a rule, an algorithm, a content filtering engine, a sentiment analysis model, a fuzzy text matcher, an anomaly detection software, a dynamic risk assessment engine, or any other tool or software that can be used to evaluate content. In some embodiments, a prompt for the large language model evaluator is generated dynamically and improved over time with text gradients. A response of the large language model is used to further train prompt generation, improving prompt generation over time to improve accuracy, speed, and compliance with output formats.

In some embodiments, the dynamic router analyzes each query and makes a decision about where to ideally send that query to get the most accurate answer in the least amount of time for the least cost. Factors (e.g., accuracy, cost, amount of processing time, etc.) are weighted and balanced. In some embodiments, the dynamic router may utilize one or more rules and/or machine learning model(s) to identify a ranking of evaluators to be utilized for the specific query based on a property of the query (e.g., type of query) and/or a property of the content to be analyzed (e.g., whether the content type is text, an image, audio, video, etc.). Because an evaluator may not yield a sufficiently satisfactory answer for the specific query, the evaluators are invoked in the order of ranking until a satisfactory answer (e.g., a measure of confidence of a result from an evaluator meets a specified tunable threshold value) is determined for the specific query.

At 406, using a decision tree for the structured specification of the content safety policy, it is determined whether sufficient queries have been evaluated to determine an overall result for the structured specification of the content safety policy. The queries are organized in the decision tree, and as queries are answered in 404, it is provided to the decision tree for application to the decision tree. The answer of the query may result in a certain branch of the decision tree to be taken. Taking the branch may result in a determination that a different query associated with a not taken branch does not need to be performed. For example, for a logic rule "A AND B OR C," if query "A" has evaluated to FALSE, the entire statement "A AND B" must also evaluate to FALSE and query "B" does not have to be performed. If query "C" evaluates to TRUE, query "A" and "B" do not have to be performed. Thus if the result of a query is such that only one answer is possible in a corresponding logic rule, regardless of the outcomes of one or more other queries, the other query does not have to be performed to short-circuit the overall evaluation.

If the taken branch results in a termination of the decision at an overall decision tree result for the structured specification (e.g., determination of match or match to prohibit content/policy violation), it is determined in 406 that enough queries have been evaluated to determine the overall result and the process proceeds to 408. Thus, once there is enough information to evaluate the entire decision tree, queries are halted and the overall result can be returned. If a result of the query provided to the decision tree does not result in a termination of the decision at an overall decision tree result, it is determined at 406 that not enough queries have been evaluated to determine an overall result. The process proceeds to 404 where a next query to be evaluated is selected based on which query needs to be answered to progress in the decision tree towards a termination of the decision at an overall decision tree result. For example, the next query chosen to be evaluated in 404 is a query required to take a next branch in the decision tree from a current progress location in the decision tree.

At 408, result(s) of evaluating the content are provided. For example, a result of whether the content violates or complies with the content safety policy is provided. The structured specification includes one or more sections that are evaluated independently of one another. Each section includes one or more rules or assertions to be evaluated. The rules or assertions may utilize logical operators. In some embodiments, the result includes an identification of which rule/assertion of the content safety policy was violated by the content. For example, an evaluation determination (e.g., violation/match result) for each rule/assertion included in the structured specification is provided. This may help an author better understand how the lines in the structured specification are contributing to the final outcome. In some embodiments, the result includes an evaluation determination (e.g., violation/match result) for each section included in the structured specification.

Figure 5:
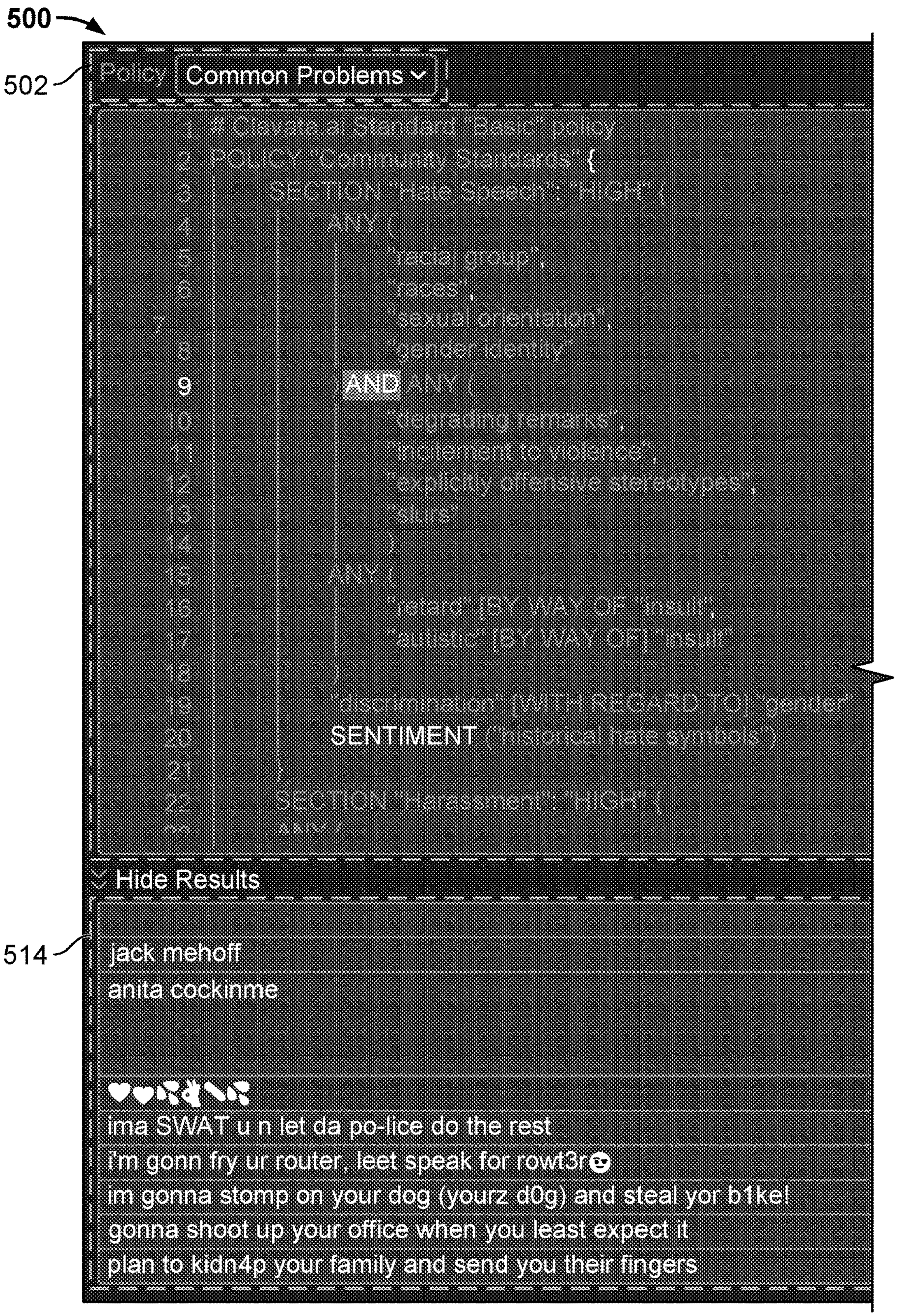
FIG. 5 is a diagram illustrating an embodiment of a user interface for developing and testing a structured specification of a content safety policy.
Figure 5:
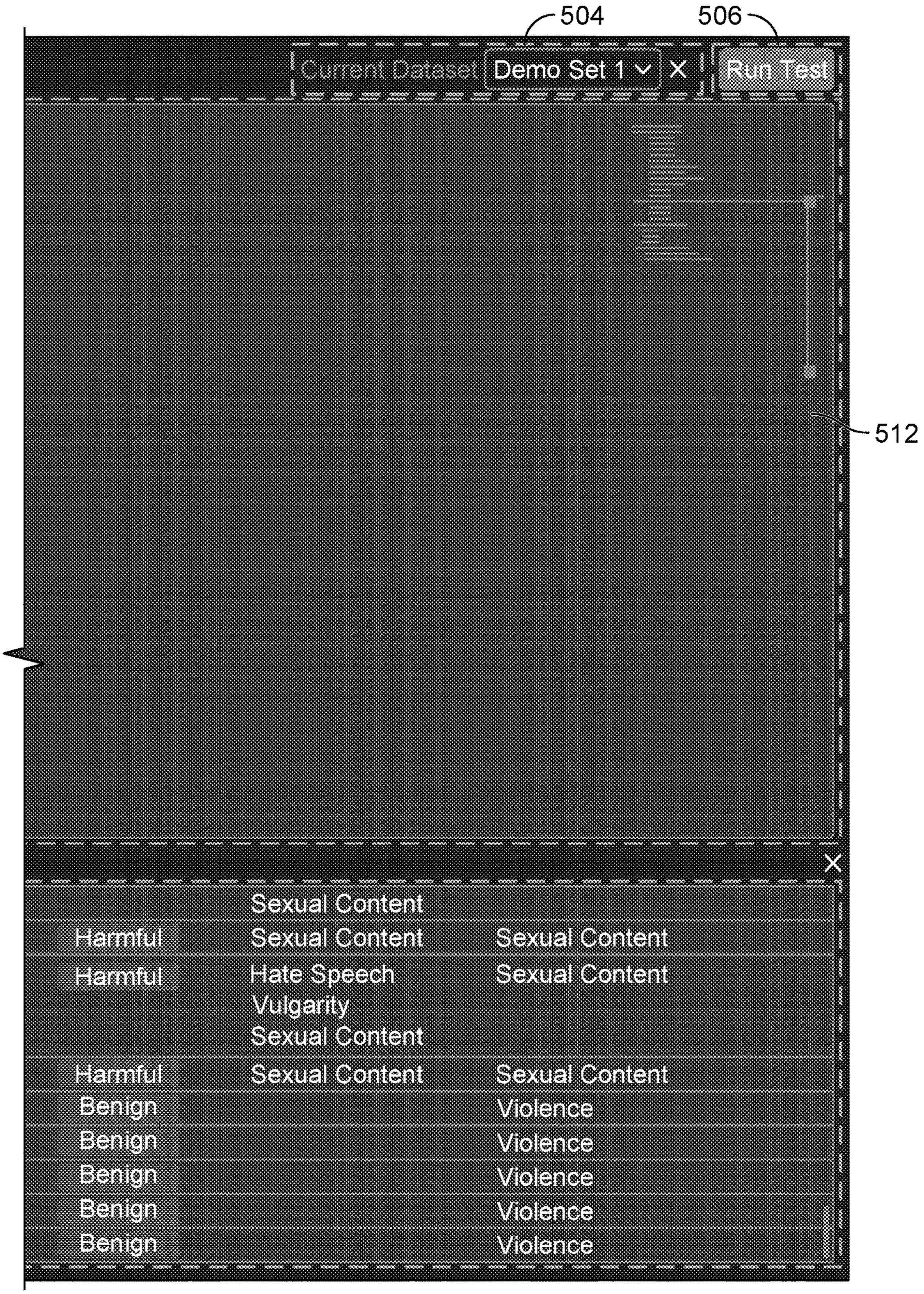

FIG. 5 is a diagram illustrating an embodiment of a user interface for developing and testing a structured specification of a content safety policy. In some embodiments, user interface 500 is provided by web interface service 122 of FIG. 1 as part of a graphical tool for developing and testing a structured specification of a content safety policy for automatic content safety. In the example shown, user interface 500 includes policy dropdown menu 502, dataset dropdown menu 504, run test button 506, text editor 512, and table display 514. In some embodiments, the text of the structured specification is displayed and modifiable in text editor 512 and the result of evaluations are displayed on table display 514. In some embodiments, user interface 500 is a component of web interface service 122 of FIG. 1, accessed via network clients such as client 102 of FIG. 1, and is used to develop and test structured specifications using the process of FIG. 1.

In some embodiments, policy dropdown menu 502 is for selecting a type of policy from a plurality of policies. The plurality of policies can include common problems, harassment, hate speech, sexual content, vulgarity, violence, player experience, or any other online safety issues. In some embodiments, a user can select a desired policy using policy dropdown menu 502 and a structured specification of the policy appears in text editor 512.

In some embodiments, dataset dropdown menu 504 is for selecting a test dataset for evaluating the structured specification listed in 512. In some embodiments, the test datasets are provided by the content safety platform that hosts the user interface. In some embodiments, the test datasets are specified by a client. In some embodiments, the test dataset is composed of content records. For example, each content record has content to be evaluated and a label. In some embodiments, the content to be evaluated includes text, an image, a video, audio, or any other format of data. In some embodiments, the label is a ground truth label. For example, the ground truth label indicates whether the content violates the structured specification and or the type of violation. In some embodiments, run test button 506 evaluates the structured specification of the content safety policy. For example, a user can select run test button 506, and the structured specification is used to evaluate the content in the test dataset selected at dataset dropdown menu 504.

In some embodiments, the results of the evaluation initiated by selecting run test button 506 are displayed in table display 514. In some embodiments, the results of the evaluation include a list of content elements and corresponding element evaluation results. For example, the results displayed in table display 514 include the evaluated content, a ground truth label, and the assigned label based on the evaluation using the structured specification, where each row in the table display 514 is a different content record. In some embodiments, the assigned label indicates whether the content violates the structured specification. In some embodiments, if it is determined that a content record violates the structured specification, the type of violation or category is also displayed in table display 514. In some embodiments, for an evaluated content record, if the assigned label does not match its ground truth label, a visual indication, such as a special label, is applied to the content record.

Figure 6:
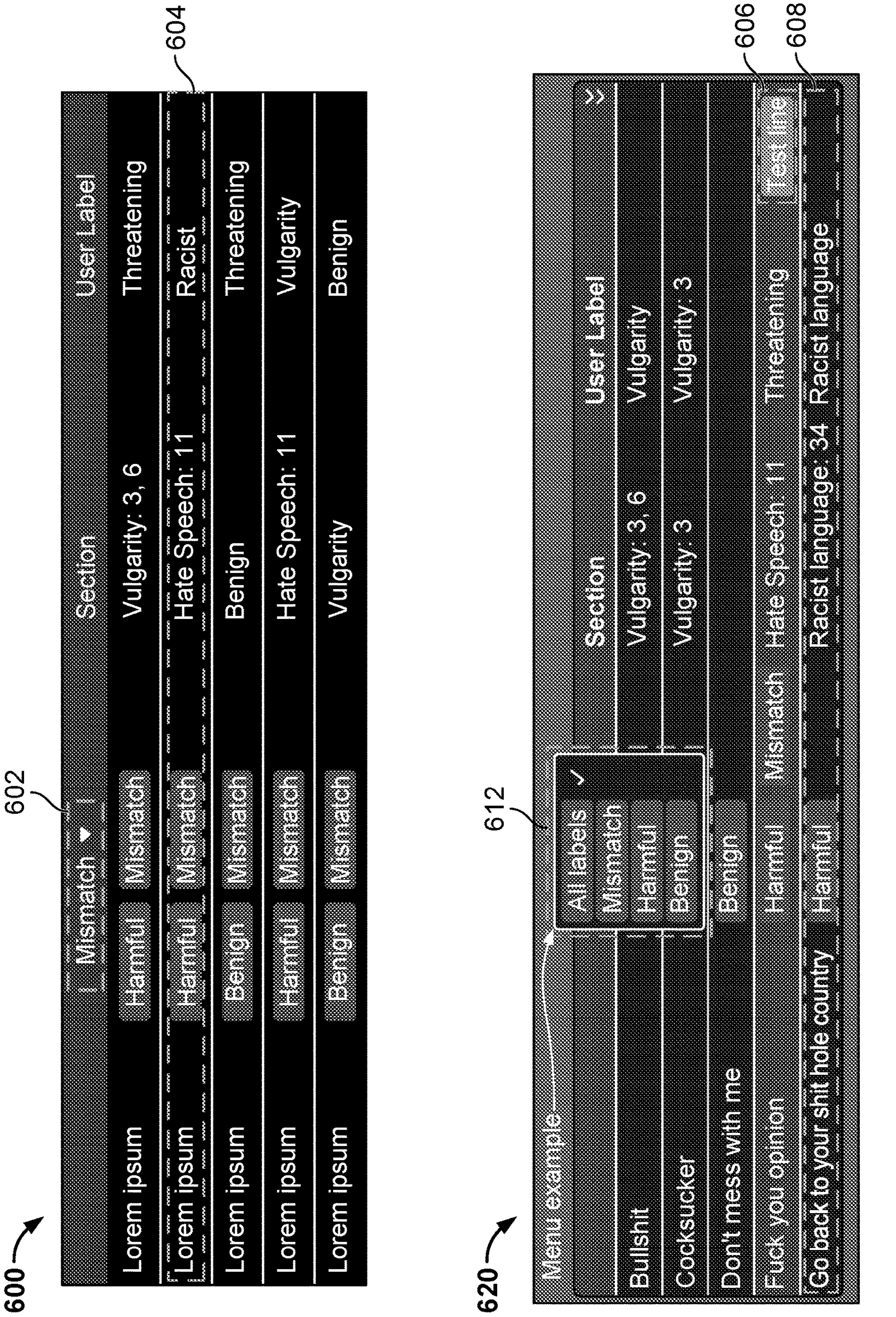
FIG. 6 is a diagram illustrating an example user interface for a table displaying evaluation results of a structured specification of a content safety policy.

FIG. 6 is a diagram illustrating an example user interface for a table displaying evaluation results of a structured specification of a content safety policy. In some embodiments, user interface 600 is provided by web interface service 122 of FIG. 1 as part of a graphical tool for testing a structured specification of a content safety policy for automatic content safety evaluation. In the example shown, user interface 600 includes dropdown menu 602 and content record 604. User interface 620 shows test line button 606, content record 608, and label menu 612. When selected, dropdown menu 602 displays label menu 612 shown in user interface 620. In some embodiments, label menu 612 includes labels such as harmful, benign, and mismatch associated with results of content evaluation performed using the structured specification. In some embodiments, the mismatch label, displayed in content record 604 and label menu 612 indicates that the determined label from the evaluation by a structured specification does not match that of the user label or ground truth label assigned to the content record. For example, content record 604 is assigned a "mismatch" label because the evaluation determined that the content violated section "hate speech" when the expected section outcome was "racist." The determined violated section matches the user label for content record 608, and thus content record 608 received just the "harmful" label. In some embodiments, test line button 606 allows the user interacting with user interface 620 to evaluate a single content record among a plurality of content records.

Figure 7:
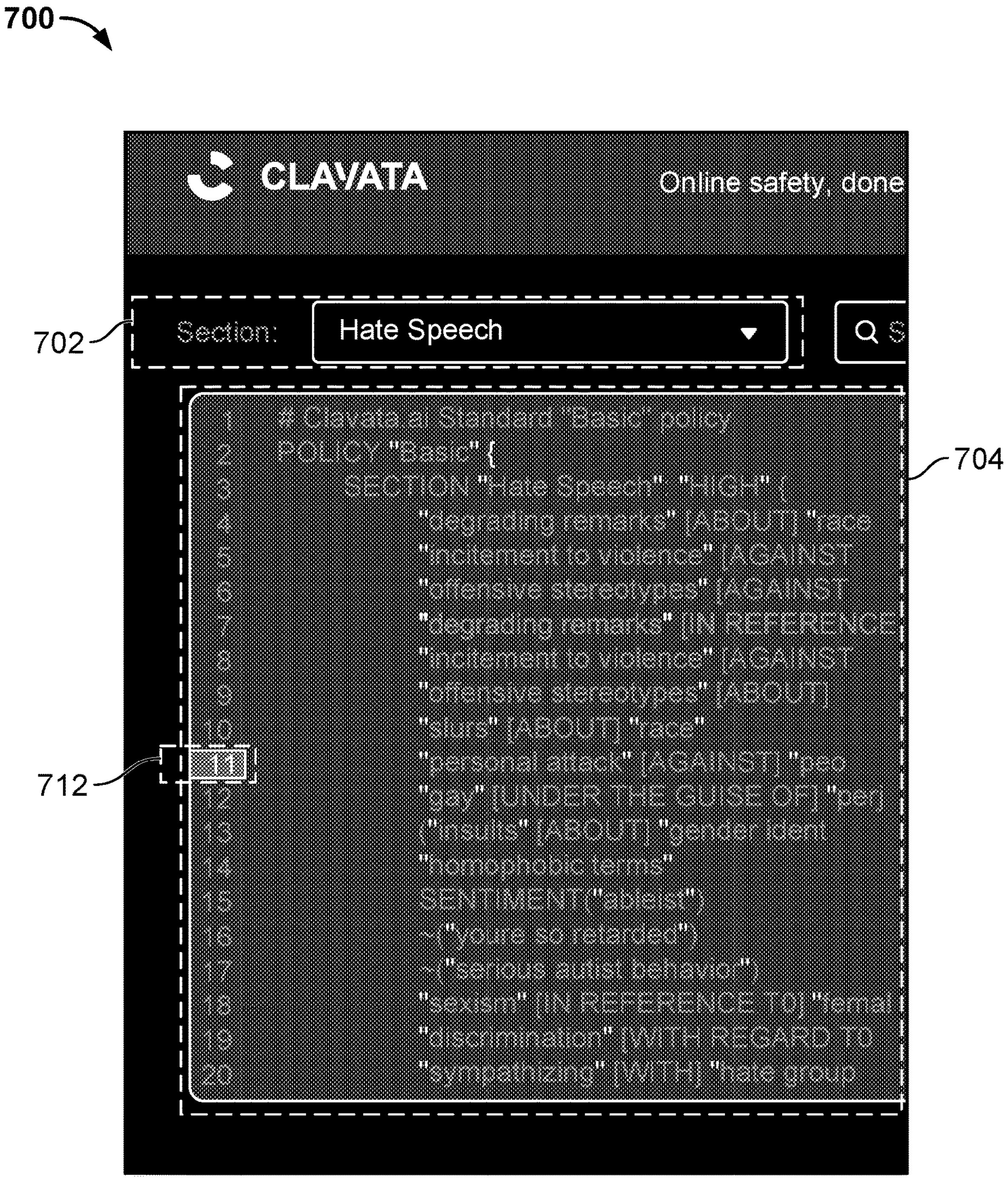
FIG. 7 is a diagram illustrating an example user interface for indicating a violated rule/assertion of a structured specification of a content safety policy for content being evaluated.

FIG. 7 is a diagram illustrating an example user interface for indicating a violated rule/assertion of a structured specification of a content safety policy for content being evaluated. In some embodiments, user interface 700 is provided by web interface service 122 of FIG. 1 as part of a graphical tool for developing and testing a structured specification of a content safety policy for automatic content safety evaluation. In the example shown, user interface 700 includes policy dropdown menu 702, text editor 704, and visual marker 712. In some embodiments, policy dropdown menu 702 indicates which content safety policy is displayed in the text editor 704 in the form of a structured specification. In some embodiments, policy dropdown menu 702 is policy dropdown menu 502 of FIG. 5. In some embodiments, the structured specification displayed in text editor 704 can be edited by a user. In some embodiments, visual marker 712 provides an indication of the portion of the structured specification that caused a determination that the content violates the content safety policy. For example, visual marker 712 highlights a row, and the row corresponds to an assertion in the structured specification of a content safety policy that was determined to be false for the evaluated content.

Figure 8:
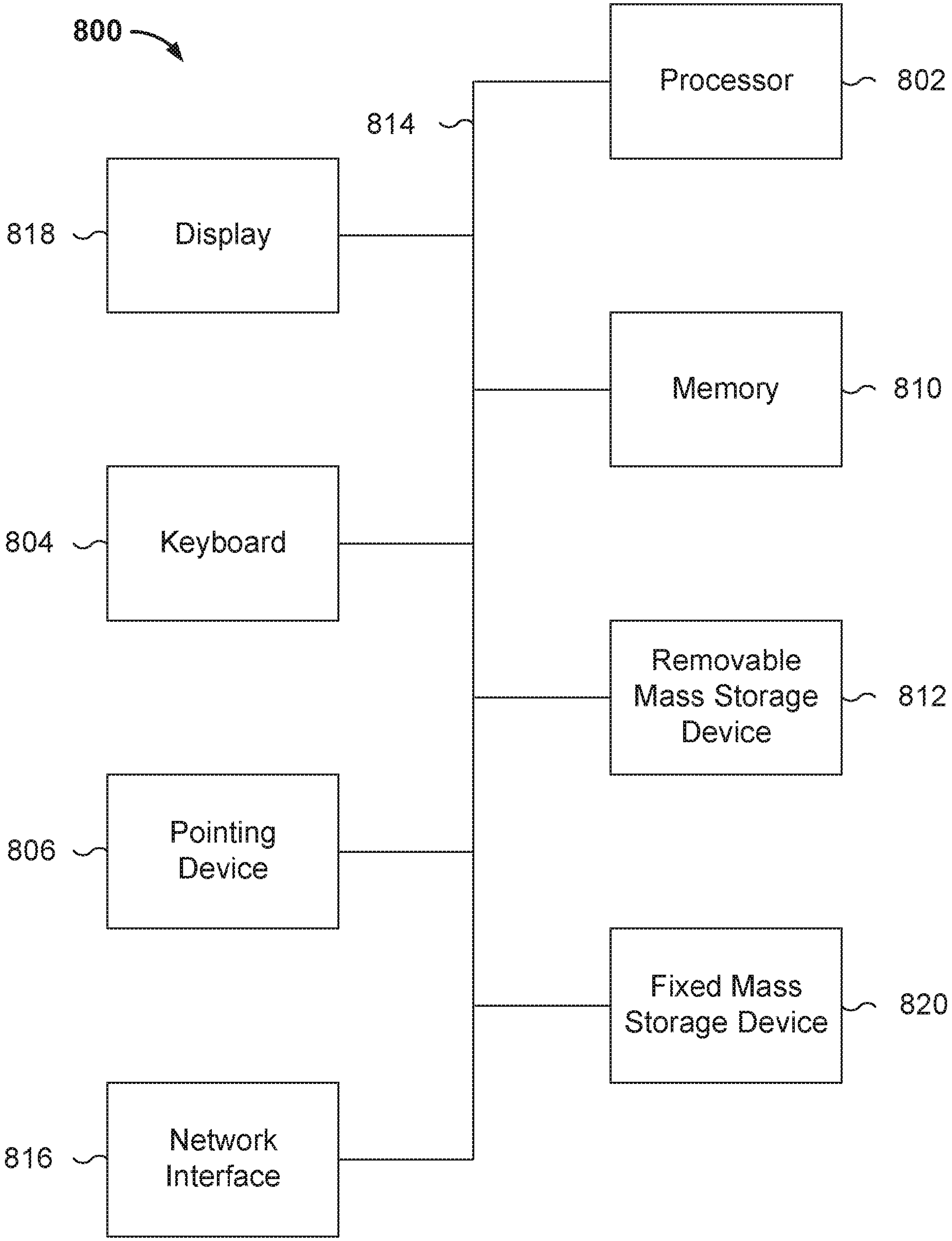
FIG. 8 is a functional diagram illustrating a programmed computer system for performing automatic content safety evaluation using a content safety platform.

FIG. 8 is a functional diagram illustrating a programmed computer system for performing automatic content safety evaluation using a content safety platform. As will be apparent, other computer system architectures and configurations can be utilized for performing related entity record resolution and entity resolution using machine learning models. Examples of computer system 800 include client 102 of FIG. 1, one or more computers used to implement content safety platform 112 of FIG. 1, one or more computers used to implement web interface service 122 of FIG. 1, one or more computers used to implement evaluation route analyzer 124 of FIG. 1, one or more computers used to implement data repository 126 of FIG. 1, one or more computers used to implement evaluator 132, and one or more computers used to implement evaluator 134. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818). In various embodiments, one or more instances of computer system 800 can be used to implement at least portions of the processes of FIGS. 2 through 4.

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data and objects used by the processor 802 to perform its functions (e.g., programmed instructions). For example, memory 810 can include any suitable computer-readable storage media, described below, depending on whether, for example, data access needs to be bi-directional or unidirectional. For example, processor 802 can also directly and very rapidly retrieve and store frequently needed data in a cache memory (not shown).

A removable mass storage device 812 provides additional data storage capacity for the computer system 800, and is coupled either bi-directionally (read/write) or unidirectionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storages 812, 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

providing, on a graphical content safety policy user interface, text of a structured specification of a content safety policy conforming to a syntax of a policy domain-specific structured computer language for consistent, explainable, and scalable automatic computer application, wherein the structured specification conforming to the syntax includes a context keyword for specifying a contextual dependency between identified content objects or signals and the context keyword is identified as a context keyword operator based on a special character formatting of the context keyword operator different from the identified content objects or signals;

receiving content to be evaluated;

evaluating the content using the structured specification to determine whether the content violates the content safety policy, including by decomposing the structured specification into a plurality of discrete query evaluations organized within a decision tree, dynamically routing the plurality of discrete query evaluations at content safety policy evaluation runtime to a corresponding plurality of distinct machine learning evaluators, and halting the dynamic routing of subsequent discrete query evaluations to the plurality of distinct machine learning evaluators when a deterministic result is reached in the decision tree;

in response to a determination that the content violates the content safety policy, identifying a specific syntax line of the structured specification that successfully executed at runtime against the content and caused the determination that the content violates the content safety policy despite the specific syntax line of the structured specification being syntactically correct at compile time, wherein specific syntax line includes the keyword operator in the special character formatting;

causing, on the graphical content safety policy user interface, a display of an indication of the specific syntax line of the structured specification that successfully executed and caused the determination that the content violates the content safety policy despite the specific syntax line of the structured specification being syntactically correct, wherein the indication includes providing on a graphical content safety policy syntax testing user interface, a visual highlight of the specific syntax line including the keyword operator in the special character formatting to identify a runtime logical policy failure different from a compile-time syntax error, wherein the visual highlight of the specific syntax line includes a highlight of a line number for the specific syntax line; and receiving, via the graphical content safety policy user interface, a modification to the structured specification and, in response, using a computer processor to automatically re-evaluate the content using the modified structured specification and providing an updated automatic content safety policy determination.

2. The method of claim 1, wherein the structured specification includes Boolean logic.

3. The method of claim 1, wherein the special character formatting of the context keyword operator includes brackets enclosing the context keyword.

4. The method of claim 1, wherein the structured specification includes a question.

5. The method of claim 1, wherein the syntax conforms to a hierarchical order of operations.

6. The method of claim 1, wherein the content to be evaluated includes a test dataset.

7. The method of claim 1, wherein the structured specification is at least in part automatically generated using a machine learning language model based on a prose text description version of the content safety policy.

8. The method of claim 1, further comprising using a machine learning language model to generate a prose text description version of the content safety policy specified by the structured specification.

9. The method of claim 1, wherein the content to be evaluated is provided by a user of content platform being protected by the content safety policy.

10. The method of claim 1, wherein evaluating the content includes generating a set of queries and selecting for each of at least a portion of the set of queries, which type of evaluation among a plurality of types of evaluations to perform.

11. The method of claim 10, wherein the plurality of types of evaluations includes a large language model evaluation, an objection detection model evaluation, a heuristic evaluation, or an embedding evaluation.

12. The method of claim 1, wherein evaluating the content includes using a decision tree to determine when a sufficient portion of the structured specification has been evaluated to reach a result.

13. The method of claim 1, further comprising performing a responsive action in response to a determination that the content violates the content safety policy, wherein the responsive action includes blocking the content from being displayed to a user or indicating the content for additional or human evaluation.

14. The method of claim 1, wherein the content to be evaluated includes a test dataset having content records, each content record having content to be evaluated and a ground truth label indicating whether the content violates the structured specification.

15. The method of claim 1, further comprising identifying a violation type or category in response to a determination that the content violates the content safety policy.

16. The method of claim 1, further comprising receiving a modification to the structured specification via a provided user interface and receiving an indication to evaluate a portion of the content using the modified structured specification.

17. The method of claim 1, further comprising providing text of the structured specification and a result of the evaluation on a same screen of a content safety policy user interface.

18. The method of claim 17, wherein the result of the evaluation includes a list of content elements and corresponding element evaluation results.

19. A system, comprising:

a processor configured to:

provide, on a graphical content safety policy user interface, text of a structured specification of a content safety policy conforming to a syntax of a policy domain-specific structured computer language for consistent, explainable, and scalable automatic computer application, wherein the structured specification conforming to the syntax includes a context keyword for specifying a contextual dependency between identified content objects or signals and the context keyword is identified as a context keyword operator based on a special character formatting of the context keyword operator different from the identified content objects or signals;

receive content to be evaluated;

evaluate the content using the structured specification to determine whether the content violates the content safety policy, including by decomposing the structured specification into a plurality of discrete query evaluations organized within a decision tree, dynamically routing the plurality of discrete query evaluations at content safety policy evaluation runtime to a corresponding plurality of distinct machine learning evaluators, and halting the dynamic routing of subsequent discrete query evaluations to the plurality of distinct machine learning evaluators when a deterministic result is reached in the decision tree;

in response to a determination that the content violates the content safety policy, identify a specific syntax line of the structured specification that successfully executed at runtime against the content and caused the determination that the content violates the content safety policy despite the specific syntax line of the structured specification being syntactically correct at compile time, wherein specific syntax line includes the keyword operator in the special character formatting;

cause, on the graphical content safety policy user interface, a display of an indication of the specific syntax line of the structured specification that successfully executed and caused the determination that the content violates the content safety policy despite the specific syntax line of the structured specification being syntactically correct, wherein the indication includes providing on a graphical content safety policy syntax testing user interface, a visual highlight of the specific syntax line including the keyword operator in the special character formatting to identify a runtime logical policy failure different from a compile-time syntax error, wherein the visual highlight of the specific syntax line includes a highlight of a line number for the specific syntax line; and receive, via the graphical content safety policy user interface, a modification to the structured specification and, in response, automatically re-evaluate the content using the modified structured specification and providing an updated automatic content safety policy determination; and a memory coupled to the processor and configured to provide the processor with instructions.

20. A computer program product embodied in a non-transitory computer readable medium and comprising computer instructions for:

providing, on a graphical content safety policy user interface, text of a structured specification of a content safety policy conforming to a syntax of a policy domain-specific structured computer language for consistent, explainable, and scalable automatic computer application, wherein the structured specification conforming to the syntax includes a context keyword for specifying a contextual dependency between identified content objects or signals and the context keyword is identified as a context keyword operator based on a special character formatting of the context keyword operator different from the identified content objects or signals;

receiving content to be evaluated;

evaluating the content using the structured specification to determine whether the content violates the content safety policy, including by decomposing the structured specification into a plurality of discrete query evaluations organized within a decision tree, dynamically routing the plurality of discrete query evaluations at content safety policy evaluation runtime to a corresponding plurality of distinct machine learning evaluators, and halting the dynamic routing of subsequent discrete query evaluations to the plurality of distinct machine learning evaluators when a deterministic result is reached in the decision tree;

in response to a determination that the content violates the content safety policy, identifying a specific syntax line of the structured specification that successfully executed at runtime against the content and caused the determination that the content violates the content safety policy despite the specific syntax line of the structured specification being syntactically correct at compile time, wherein specific syntax line includes the keyword operator in the special character formatting;

causing, on the graphical content safety policy user interface, a display of an indication of the specific syntax line of the structured specification that successfully executed and caused the determination that the content violates the content safety policy despite the specific syntax line of the structured specification being syntactically correct, wherein the indication includes providing on a graphical content safety policy syntax testing user interface, a visual highlight of the specific syntax line including the keyword operator in the special character formatting to identify a runtime logical policy failure different from a compile-time syntax error, wherein the visual highlight of the specific syntax line includes a highlight of a line number for the specific syntax line; and receiving, via the graphical content safety policy user interface, a modification to the structured specification and, in response, automatically re-evaluating the content using the modified structured specification and providing an updated automatic content safety policy determination.

* * * * *